United States Patent
Marrou et al.

(10) Patent No.: US 10,472,443 B2
(45) Date of Patent: Nov. 12, 2019

(54) HIGHLY RANDOM ACRYLAMIDE-ACRYLIC ACID COPOLYMERS

(71) Applicant: Ecolab USA Inc., St. Paul, MN (US)

(72) Inventors: Stephen Marrou, Mount Prospect, IL (US); Xiangyang Zhu, Denver, CO (US); Heqing Huang, Naperville, IL (US)

(73) Assignee: Ecolab USA Inc., St. Paul, MN (US)

( * ) Notice: Subject to any disclaimer, the term of this patent is extended or adjusted under 35 U.S.C. 154(b) by 228 days.

(21) Appl. No.: 15/190,381

(22) Filed: Jun. 23, 2016

(65) Prior Publication Data
US 2016/0376389 A1 Dec. 29, 2016

Related U.S. Application Data

(60) Provisional application No. 62/186,107, filed on Jun. 29, 2015.

(51) Int. Cl.
*C08F 220/56* (2006.01)
*C08F 2/32* (2006.01)

(52) U.S. Cl.
CPC .............. *C08F 220/56* (2013.01); *C08F 2/32* (2013.01)

(58) Field of Classification Search
CPC ............ C08L 33/26; C08L 33/02; C08K 3/18
See application file for complete search history.

(56) References Cited

U.S. PATENT DOCUMENTS

| | | | |
|---|---|---|---|
| 3,284,393 A | 11/1966 | Vanderhoff et al. | |
| 4,488,601 A | 12/1984 | Hammett | |
| 4,525,496 A | 6/1985 | Adaway et al. | |
| 5,065,822 A | 11/1991 | Miller et al. | |
| 5,079,278 A | 1/1992 | Mitchell | |
| 5,480,933 A * | 1/1996 | Fox ........................ | C09K 8/512 166/295 |
| 6,387,986 B1 * | 5/2002 | Moradi-Araghi ...... | C09K 8/516 166/300 |
| 6,723,781 B1 | 4/2004 | Frat et al. | |
| 2006/0266488 A1 | 11/2006 | Doherty et al. | |
| 2016/0032170 A1 | 2/2016 | Li et al. | |

FOREIGN PATENT DOCUMENTS

| WO | 2011/112470 A2 | 9/2011 |
|---|---|---|
| WO | 2011/113470 A1 | 9/2011 |

OTHER PUBLICATIONS

Rintoui et al., "Polymerization of ionic monomers in polar solvents: kinetics and mechanism of the free radical copolymerization of acrylamide/acrylic acid," Polymer 46, (2005), pp. 4525-4532.
International Search Report for International Application No. PCT/US2016/038903, dated Sep. 6, 2016, 3 pages.
Written Opinion for International Application No. PCT/US2016/038903, dated Sep. 6, 2016, 5 pages.
Hassan, Saleh F. et al. "Study of Polyacrylamide/Cr (III) Hydrogels for Conformance Control in Injection Wells to Enhance Chemical Flooding Process." SPE International, 168069, May 2013, 11 pages.
Johnson, Stephen et al. "Effects of Divalent Cations, Seawater, and Formation Brine on Positively Charged Polyethylenimine/Destran Sulfate/Chromium(III) Polyelectrolyte Complexes and Partially Hydrolyzed Polyacrylamide/Chromium(III) Gelation." Journal of Applied Polymer Science, vol. 115, 2010, pp. 1008-1014.
Sigale, Karine et al. "Aspects of Crosslinking Sulfonated Polyacrylamides from Rheological Studies on Their Gels." Journal of Applied Polymer Science, vol. 64, 1997, pp. 1067-1072.
Bjørsvik, Magny et al. "Formation of colloidal dispersion gels from aqueous polyacrylamide solutions." Colloids and Surfaces A: Physicochem. Eng. Aspects, vol. 317, 2008, pp. 504-511.
Muruaga, E. et al. "Combining Bulk Gels and Colloidal Dispersion Gels for Improved Volumetric Sweep Efficiency in a Mature Waterflood." SPE International, 113334, Apr. 2008, 12 pages.
Wang, Wei et al. "Applications of Weak Gel for In-Depth Profile Modification and Oil Displacement." Journal of Canadian Petroleum Technology, vol. 42, No. 6, Jun. 2003. pp. 54-61.
Marudova-Zsivanovits, Mariya et al. "Rheological Investigation of Xanthan Gum-Chromium Gelation and Its Relation to Enhanced Oil Recovery." Journal of Applied Polymer Science, vol. 103, 2007, pp. 160-166.
Smith, J.E. "Performance of 18 Polymers in Aluminum Citrate Colloidal Dispersion Gels." SPE International, 28989, Feb. 1995, 10 pages.
Zhidong, Guo et al. "The Study of Oil Displacement Characteristics of CDG and Polymer Flooding." SPE International, 144119, Jul. 2011, 14 pages.
Chang, Harry L. et al. "Successful Field Pilot of In-Depth Colloidal Dispersion Gel (CDG) Technology in Daqing Oil Field." SPE International, 89460, Apr. 2004, 15 pages.
Ranganathan, Raja et al. "Experimental Study of the Gelation Behavior of a Polyacrylamide/Aluminum Citrate Colloidal-Dispersion Gel System." SPE Journal, Dec. 1998, pp. 337-343.
Ai-Assi, A.A. et al. "Formation and Propagation of Gel Aggregates Using Partially Hydrolyzed Polyacrylamide and Aluminum Citrate." SPE Journal, Sep. 2009, pp. 450-461.
Riahinezahad, Marzieh et al. "Effect of Ionic Strength on the Reactivity Ratios of Acrylamide/Acrylic Acid (sodium acrylate) Copolymerization." Journal of Applied Polymer Science, vol. 131, No. 20, 2014, 7 pages.
Paril, Ahmet et al. "Composition Control Through pH and Ionic Strength During Acrylic Acid/Acrylamide Copolymerization." Journal of Applied Polymer Science, vol. 127, No. 5, 2012, 7 pages.

(Continued)

*Primary Examiner* — Wenwen Cai
(74) *Attorney, Agent, or Firm* — Kagan Binder, PLLC

(57) ABSTRACT

Highly random acrylamide-acrylic acid copolymers are described. Ionic crosslinking of the highly random copolymers in dilute solution results in improved viscosity and gel strength compared to copolymers prepared by conventional methods. The ionically crosslinked copolymers are useful in enhanced oil recovery processes.

9 Claims, 2 Drawing Sheets

(56) References Cited

OTHER PUBLICATIONS

Riahinezhad, Marzieh et al. "Optimal Estimation of Reactivity Ratios for Acrylamide/Acrylic Acid Copolymerization." Journal of Polymer Science, vol. 51, No. 22, 2013, pp. 4819-4827.

Preusser, Calista et al. "An In-Situ NMR Study of Radical Copolymerization Kinetics of Acrylamide and Non-Ionized Acrylic Acid in Aqueous Solution." Macromol. Sympo., vol. 333, 2013, pp. 122-137.

Paril, A. et al. "Effect of Medium pH on the Reactivity Ratios in Acrylamide Acrylic Acid Copolymerization." Journal of Applied Polymer Science, vol. 103, No. 2. pp. 968-974.

Rintoul, Ignacio et al. "Polymerization of ionic monomers in polar solvents: kinetics and mechanism of the free radical copolymerization of acrylamide/acrylic acid." Polymer, vol. 46, No. 13, 2005, pp. 4525-5432.

Truong, N.D. et al. "Microstructure of acrylamide-acrylic acid copolymers: 2. As obtained by direct copolymerization." Polymer, vol. 27, No. 3, 1986, pp. 467-475.

Shawki, S.M. et al. "Estimation of the Reactivity Ratios in the Copolymerization of Acrylic Acid and Acrylamide from Composition-Conversion Measurements by an Improved Nonlinear Least-Squares Methods." Journal of Applied Polymer Science, vol. 23, No. 11, 1979, pp. 3155-3166.

Ponratnam, Surendra et al. "Reactivity Ratios of Ionizing Monomers in Aqueous Solution." Makromol. Chem. vol. 178, No. 4, 1977, pp. 1029-1038.

Polymer Letters, "Representation of Composition and Blockiness of the Copolymer by a Triangular Coordinate System," vol. 1, pp. 359-363 (1963).

Halverson, et al., "Sequence Distribution of Carboxyl Groups in Hydrolyzed Polyacrylamide," Macromolecules 18 (6), pp. 1139-1144 (1985).

R.A.M.Thomson, "A Kinetic Study of the Adiabatic Polymerization of Acrylamide," Journal of Chemical Education, vol. 63 No. 4, pp. 362-364 (1986).

Higuchi et al, Kinetic Aspects of the Alkaline Hydrolysis of Poly(acrylamide), Polymer Journal, vol. 3, No. 3, pp. 370-377, (1972).

International Search Report for International Application No. PCT/US2016/038905, dated Sep. 11, 2016, 3 pages.

Written Opinion for International Application No. PCT/US2016/038905, dated Sep. 11, 2016, 5 pages.

European Search Report for European Application No. 16818493.5, dated Jan. 8, 2019, 6 pages.

Fred W. Billmeyer, Jr., "Monomer Reactivity Ratios", Textbook of Polymer Science, Third Ed. (1984) pp. 103-104.

* cited by examiner

HIGHLY RANDOM ACRYLAMIDE-ACRYLIC ACID COPOLYMERS

TECHNICAL FIELD

The invention relates to copolymers of acrylamide and acrylic acid and the crosslinked products thereof.

BACKGROUND

Polyacrylamide (PAM) and copolymers thereof with acrylic acid (PAMAA) are well known in the industry for a plethora of applications. Commercially important applications of these copolymers include their use as flocculants in water treatment or papermaking processes, as rheological additives for water or waterbased solutions in applications such as enhanced oil recovery (EOR), as water absorptive agents when dried, and as friction reduction agents in waterbased formulations.

In dilute aqueous solutions, such as 1 wt % or less commonly employed in EOR applications, PAM and its copolymers are susceptible to chemical, thermal, and mechanical degradation. The conditions encountered in EOR applications can include one or more of high shear, harsh chemical environments, and temperatures of 70° C. and higher. Chemical degradation occurs when the amide moiety hydrolyzes at elevated temperature and/or pH, resulting in the evolution of ammonia and a residual carboxyl group. Thermal degradation of the vinyl backbone may occur through any one or more of several possible radical mechanisms. Mechanical degradation can also be an issue at the high shear rates experienced in the near-wellbore region, and within pumps and mixing devices designed to prepare the EOR solutions for injection into a reservoir.

Cross-linked variants of polyacrylamide have shown greater resistance to all of these methods of degradation, and have proved to provide viscosity stability in EOR applications. One commercially important type of crosslinked polymer used in EOR applications is PAMAA ionically crosslinked via interaction of the acrylic acid moieties with multivalent cations. Salts of $Ca^{2+}$, $Mg^{2+}$, $Zn^{2+}$, $Cr^{2+}$, and $Al^{3+}$, for example, are employed commercially to form ionic crosslinks with the copolymers. In aqueous solutions, such polymers have increased viscosity compared to uncrosslinked polymers. Additionally, the crosslinks are capable of reforming after thermal or mechanical disruption during use. In such ionically crosslinked systems, it is desirable to employ a polymer having acrylic acid moieties arranged randomly throughout the copolymer, because this leads to maximum crosslink efficiency and the highest possible effective molecular weight of the crosslinked composition. As a practical matter, random acrylic acid placement in a copolymer leads to the observation that subsequent ionic crosslinking is efficient in raising the viscosity of aqueous solutions of the polymer; and a blockier copolymer requires more crosslinker to reach the same solution viscosity as a similar but more random copolymer.

In theory there are two ways to form poly(acrylamide-co-acrylic acid): by directly copolymerizing acrylamide and acrylic acid, or by post-treating an acrylamide polymer by partial hydrolysis to form carboxylate moieties; such polymers are often referred to in the industry as "HPAM". Direct copolymerization of acrylamide and acrylic acid (or the conjugate base thereof) leads to blocky copolymers due to the large reactivity ratio differences. Rintoul and Wandrey, Polymer 46 (2005), 4525-4532 have reported polymerization reactivity ratios for acrylamide and acrylic acid as a function of several different variables. Reproduced below is a table showing the pH dependence of reactivity ratios $r_1$ (acrylamide) and $r_2$ (acrylic acid) in copolymerization reactions carried out at a total monomer concentration of 0.4 mol/L in water at 40° C.

Reactivity ratios of AM ($r_1$) and AA ($r_2$) at different pHs. Reaction conditions: T=313 K, [AM]+[AA]=0.4 mol/l, [$K_2S_2O_8$]=1.8×10$^{-2}$ mol/l. Source: Rintoul and Wandrey, Polymer 46 (2005), 4525-4532.

|     | Reactivity ratios | |
| --- | --- | --- |
| pH  | r1  | r2  |
| 1.8 | 0.54 | 1.48 |
| 2.7 | 0.69 | 1.34 |
| 3.6 | 0.82 | 1.28 |
| 4.4 | 1.27 | 0.91 |
| 5.3 | 1.83 | 0.51 |
| 6.2 | 2.50 | 0.39 |
| 7.8 | 2.95 | 0.42 |
| 8.8 | 3.05 | 0.42 |
| 12  | 3.04 | 0.32 |

Commercially, preparation of PAMAA is often carried out by the post-treatment route, starting with PAM homopolymer. Hydrolysis may be carried out by synthesizing or dispersing a PAM homopolymer in water, adding a concentrated sodium hydroxide solution, and heating the mixture. However, as noted above hydrolysis of acrylamide functionality leads to evolution of ammonia ($NH_3$), so special equipment is required to carry out the procedure. Additionally, the process requires a significant amount of heat energy.

Water-in-oil (w/o) latices are commercially significant sources of PAM and PAM copolymers for EOR applications due to their high solids content (up to 60-80 wt % polymer) combined with low viscosity and rapid inversion to use concentration, resulting in ease of use in the field. Due to the difficulty of post-emulsification, w/o latices of PAM or PAM copolymers are formed commercially by emulsifying the monomers and polymerizing in situ. Post-hydrolysis of the w/o latices requires formulation to impart latex stability during the hydrolysis step.

The post-treatment technique has the advantage of providing more randomly distributed carboxyl groups along the polymer backbone than is possible by conventional copolymerization of the two monomers as starting materials. See, e.g. M. Higuchi and R. Senju, "Kinetic aspects of alkaline hydrolysis of poly(acrylamide)", Polymer Journal, Vol 3, No. 3, pages 370-377 (1972). When ionically crosslinked as described above, such post-hydrolyzed copolymers provide a higher viscosity at a given level of crosslinker than copolymers obtained by copolymerization of acrylamide and acrylic acid at neutral pH, in theory due to the increased randomness of the acrylic acid distribution when compared to copolymerization.

There is a need in the industry to provide PAMAA copolymers using methods that do not result in evolution of $NH_3$. There is a need in the industry to provide PAMAA copolymers having increased solution viscosity when ionically crosslinked. There is a need in the industry to provide PAMAA latices, solutions, and dry powdered PAMAA polymers that are easily formed using conventional equipment. There is a need in the industry to provide ionically crosslinked PAMAA wherein the amount of crosslinker required to reach a target viscosity is less than the amount of crosslinker required to reach the same viscosity for a PAMAA copolymer formed via post-treatment hydrolysis of PAM.

SUMMARY

Disclosed herein is a crosslinked composition comprising a water source, about 100 ppm to 1500 ppm of a copolymer of acrylamide and acrylic acid, and about 5 ppm to 100 ppm of an ionic crosslinker, wherein the copolymer has a blockiness index of about 0.95 to 1.05. In some embodiments the copolymer consists essentially of acrylamide and acrylic acid residues. In some embodiments the polymer comprises at least 50 mole % acrylamide residue. In some embodiments the polymer comprises about 70 mole % acrylamide residue. In some embodiments the ionic crosslinker comprises the salt of a multivalent cation comprising $Ca^{2+}$, $Mg^{2+}$, $Zn^{2+}$, $Cr^{2+}$, $Cr^{3+}$, and $Al^{3+}$ or a combination of two or more thereof. In some embodiments the counterion of the ionic crosslinker is the residue of an organic acid. In some embodiments the organic acid is acetic acid or citric acid. In some embodiments the viscosity of the crosslinked composition is about 2× to 1000× times the viscosity of the corresponding composition without the ionic crosslinker.

Also disclosed herein is a composition derived from the method comprising: combining monomers comprising acrylamide and acrylic acid in water to form a solution comprising about 10 wt % to 70 wt % of the combined monomers; adjusting the pH of the solution to between about 3 and 5; polymerizing the monomers to form a polymer having a reduced specific viscosity of at least about 30 dL/g; optionally neutralizing the solution to a pH of greater than about 5 after polymerizing; diluting the polymer with water to form a dilute polymer solution; and adding about 1 ppm to 150 ppm of an ionic crosslinker to the dilute polymer solution to form a dilute crosslinked solution. In some embodiments the solution is a water phase, and the method further comprises combining the water phase with an oil phase to form a water-in-oil emulsion prior to the polymerizing, the oil phase comprising one or more surfactants. In some embodiments, the method further comprises drying the polymer after the polymerizing and prior to the diluting. In some embodiments, the diluting and the adding are accomplished contemporaneously.

Additional advantages and novel features of the invention will be set forth in part in the description that follows, and in part will become apparent to those skilled in the art upon examination of the following, or may be learned through routine experimentation upon practice of the invention.

DETAILED DESCRIPTION

Figure 1:
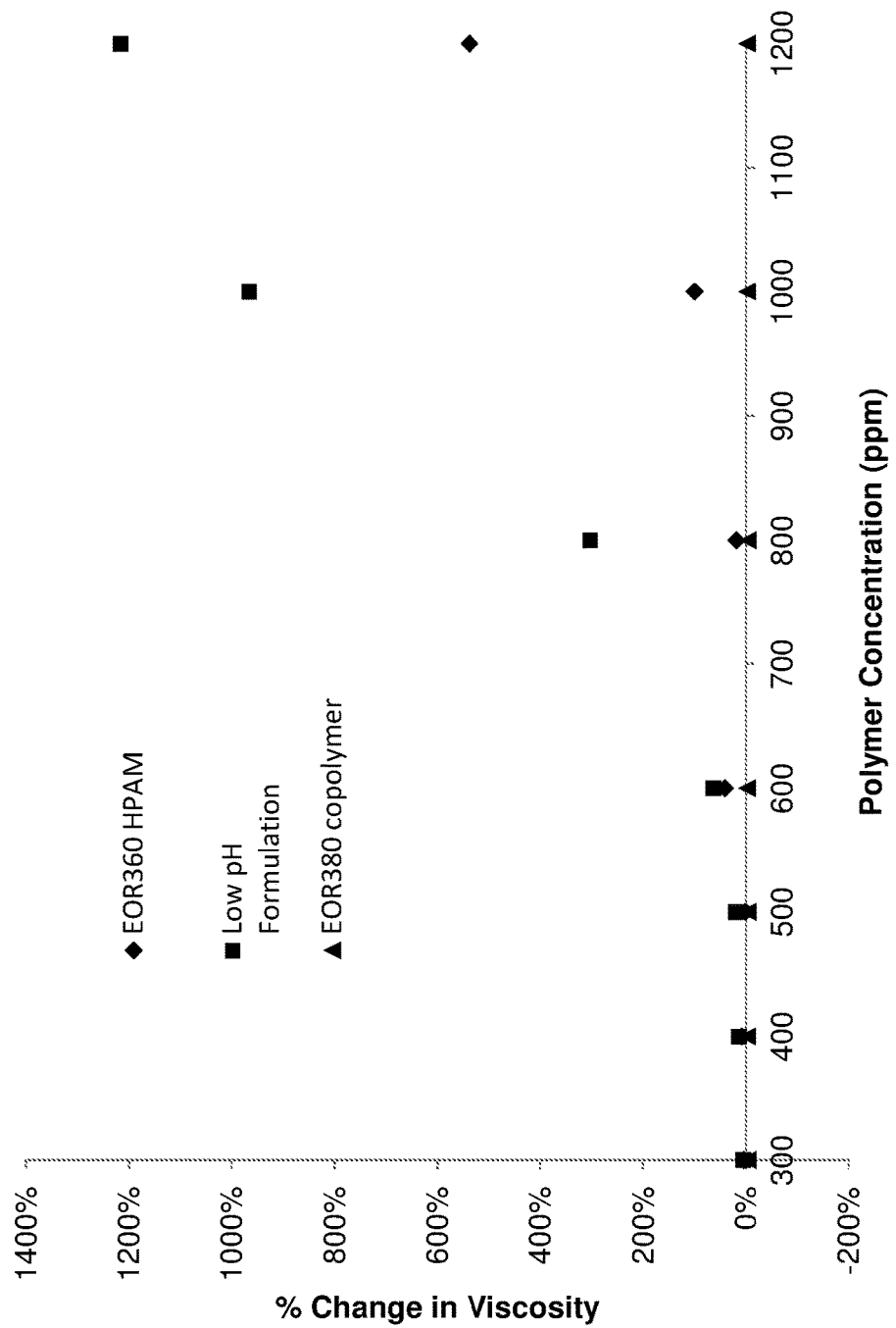
FIG. 1 is a plot of viscosity as a function of polymer concentration for a polymer of the invention.

Although the present disclosure provides references to preferred embodiments, persons skilled in the art will recognize that changes may be made in form and detail without departing from the scope of the invention. Reference to various embodiments does not limit the scope of the claims attached hereto. Additionally, any examples set forth in this specification are not intended to be limiting and merely set forth some of the many possible embodiments for the appended claims.

Definitions

The term "monomer" is used in context to mean either an unsaturated compound or the polymerized residue thereof. As used herein, "acrylic acid" means the unsaturated compound or the polymerized residue thereof bearing an acidic group having a pKa of about 5 or less or the conjugate base thereof.

As used herein, the term "solution" means a compound dissolved or dispersed in a liquid. A polymer solution is a polymer substantially dispersed or dissolved in water or a waterbased solution. The polymer dispersion is a dispersion as formed, or in the case of some EOR applications the dispersion before injection, during injection, or after injection as determined by context. Waterbased solutions include one or more dissolved salts, buffers, acids, bases, surfactants, or other dissolved, dispersed, or emulsified compounds, materials, components, or combinations thereof.

As used herein, the term "water source" means a source of water comprising, consisting essentially of, or consisting of fresh water, deionized water, distilled water, produced water, municipal water, waste water such as runoff water or municipal waste water, well water, treated water, brackish water, or sea water, or a combination of two or more such water sources as determined by context. In some embodiments, the water source is at a temperature of about 20° C. to 90° C. In some embodiments, the water source has up to about 30 wt % total dissolved solids.

As used herein, the term "low pH" means pH of about 3 to 5. As used herein, "neutral pH" or related terms such as neutralize, neutralization, and the like indicates a pH of above 5, for example about 5 to 9.

As used herein, the term "water-in-oil latex", "w/o latex", or "latex" refers to one or more polymers emulsified in a water phase, further wherein the water phase is a discontinuous phase in a continuous oil phase. The term "emulsion" refers to one or more monomers emulsified in a water phase, further wherein the water phase is a discontinuous phase in an oil phase. The terms "latex" and emulsion" are not limiting with respect to particle size or discontinuous phase droplet size, but rather refer to any composition having the recited characteristics.

As used herein, the term "stable" as applied to a water-in-oil latex means a kinetically stable latex that absent any force applied, temperature change, or chemical added to a latex, the latex is or is capable of being substantially free of coagulation, plating out, precipitation, gross coalescence of phases (conventionally referred to as "separation") or any other evidence of instability conventionally associated with water-in-oil latices for at least about 24 hours at about 20° C. As used herein, the term "shelf stable" means stable for at least six months at 20° C. or a selected temperature or range thereof.

As used herein, the term "ionic crosslinker" or "crosslinking agent" means an ionic compound bearing a divalent or multivalent cation, further wherein the ionic compound is capable of dissociating in water; and blends of two or more such compounds.

As used herein, the term "dilute polymer solution" means a combination of at least a water source and a copolymer of acrylic acid and acrylamide wherein the concentration of the copolymer in the water source is about 100 ppm to 1500 ppm.

As used herein, the term "dilute crosslinked solution" means a dilute polymer solution further including an ionic crosslinker.

As used herein, the term "optional" or "optionally" means that the subsequently described event or circumstance may but need not occur, and that the description includes instances where the event or circumstance occurs and instances in which it does not.

As used herein, the term "about" modifying, for example, the quantity of an ingredient in a composition, concentration, volume, process temperature, process time, yield, flow rate, pressure, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents according to this definition. Further, where "about" is employed to describe a range of values, for example "about 1 to 5" the recitation means "1 to 5" and "about 1 to about 5" and "1 to about 5" and "about 1 to 5" unless specifically limited by context.

As used herein, the term "substantially" means "consisting essentially of", as that term is construed in U.S. patent law, and includes "consisting of" as that term is construed in U.S. patent law. For example, a solution that is "substantially free" of a specified compound or material may be free of that compound or material, or may have a minor amount of that compound or material present, such as through unintended contamination or incomplete purification. A "minor amount" may be a trace, an unmeasurable amount, an amount that does not interfere with or some other amount as provided in context. A composition that has "substantially only" a provided list of components may consist of only those components, or have a trace amount of some other component present, or have one or more additional components that do not materially affect the properties of the composition. Additionally, "substantially" modifying, for example, the type or quantity of an ingredient in a composition, a property, a measurable quantity, a method, a value, or a range, employed in describing the embodiments of the disclosure, refers to a variation that does not affect the overall recited composition, property, quantity, method, value, or range thereof in a manner that negates an intended composition, property, quantity, method, value, or range. Where modified by the term "substantially" the claims appended hereto include equivalents according to this definition.

Discussion

We have found that poly(acrylamide-co-acrylic acid) polymers ("PAMAA") are suitably formed by copolymerization of acrylamide (AM) and acrylic acid (AA) in either a waterbased solution or the water phase of a water-in-oil (w/o) latex, wherein the solution or the water phase is selected to have a pH of about 3 to 5. The waterbased solutions and the w/o latices are stable over this range of pH, and acrylamide is stable to hydrolysis over this range as well. The copolymers formed using this method are of similar molecular weight to PAM homopolymers polymerized in solution or in the water phase of a w/o latex under standard polymerization conditions. Due to the carboxylic acid functionality, the PAMAA copolymers readily undergo ionic crosslinking with salts of multivalent cations. In dilute polymer solutions of PAMAA, that is solutions comprising about 100 ppm to 1500 ppm PAMAA, for example about 150 ppm to 1000 ppm PAMAA the amount of crosslinker required for a PAMAA made according to the methods of the invention to reach a target viscosity is less than the amount required to reach the same viscosity for a PAMAA formed via hydrolysis of PAM. Stated differently, PAMAA formed using the claimed methods have substantially higher solution viscosities when crosslinked ionically in dilute solutions than PAMAA of the same monomer composition and molecular weight obtained by hydrolysis of PAM homopolymer and subjected to the same crosslinking conditions. Without wishing to be bound by theory, we believe that the PAMAA copolymers formed using the methods of the invention lead to greater randomness in the distribution of carboxylate functionality, which in turn leads to more efficient crosslinking and thus the observation of higher solution viscosity.

Low pH Solution Polymerization

Solution polymerization of PAMAA is suitably carried out in water at pH of about 2 to 5. Monomers comprising, consisting essentially of, or consisting of acrylamide (AM) and acrylic acid (AA) are blended in the desired ratio in water to form a monomer solution; the pH of the solution is adjusted to be about 2 to 5; a source of free radicals is added to the solution, and conditions favorable to initiation and polymerization of the monomers are applied to the solution to achieve a PAMAA copolymer as a polymer solution. The polymer solution is optionally neutralized after polymerization, for example to a pH above 5, such as about 5 to 13, or about 6 to 13, or about 7 to 13, or about 5 to 12, or about 5 to 11, or about 5 to 10, or about 5 to 9, or about 5 to 8, or about 6 to 10, or about 7 to 10, or about 6 to 9, or about 6 to 8.

In some embodiments, the monomer solution comprises, consists essentially of, or consists of a blend of AM and AA in water along with a free radical source. In various embodiments, the monomers are present in the monomer solution at about 20 wt % to 80 wt % of the solution, or about 25 wt % to 80 wt %, or about 30 wt % to 80 wt %, or about 35 wt % to 80 wt %, or about 40 wt % to 80 wt %, or about 45 wt % to 80 wt %, or about 50 wt % to 80 wt %, or about 20 wt % to 75 wt %, or about 20 wt % to 70 wt %, or about 20 wt % to 65 wt %, or about 20 wt % to 60 wt %, or about 30 wt % to 70 wt %, or about 35 wt % to 70 wt %, or about 40 wt % to 70 wt %, or about 40 wt % to 65 wt %, or about 40 wt % to 60 wt % of the total weight of the solution. In some embodiments, the molar ratio of AM:AA in the monomer solution is about 50:50 to 99:1, or about 55:45 to 99:1, or about 60:40 to 99:1, or about 65:35 to 99:1, or about 70:30 to 99:1, or about 50:50 to 98:2, or about 50:50 to 97:3, or about 50:50 to 96:4, or about 50:50 to 95:5, or about 50:50 to 90:10, or about 50:50 to 85:15, or about 50:50 to 80:20, or about 60:40 to 70:30, or about 60:40 to 95:5, or about 60:40 to 97:3, or about 70:30 to 95:5, or about 70:30 to 97:3 in the monomer solution.

In some embodiments, AM and AA make up substantially the entire monomer complement in the monomer solution. In other embodiments, up to 1 wt % of one or more additional monomer(s) are suitably included in the monomer solution based on the total weight of monomer. For example about 0.001 wt % to 1.00 wt %, or about 0.01 wt % to 1.00 wt %, or about 0.1 wt % to 1.00 wt %, or about 0.2 wt % to 1.00 wt %, or about 0.3 wt % to 1.00 wt %, or about 0.4 wt % to 1.00 wt %, or about 0.5 wt % to 1.00 wt %, or about 0.6 wt % to 1.00 wt %, or about 0.7 wt % to 1.00 wt %, or about 0.8 wt % to 1.00 wt %, or about 0.1 wt % to 0.9 wt %, or about 0.1 wt % to 0.8 wt %, or about 0.1 wt % to 0.7 wt %, or about 0.1 wt % to 0.6 wt %, or about 0.1 wt % to 0.5 wt % of one or more additional monomer(s) are suitably included in the monomer solution, based on the total weight of monomer included in the monomer solution. In some embodiments, a useful additional monomer includes a long-chain hydrocarbyl functionality intended to produce physical or associative crosslinking in a waterbased polymer solution. Such hydrophobically associating moieties are well known in the industry. In some embodiments, the hydrocarbyl functionality includes 8 to 20 carbons, or 10 to 20 carbons, or 12 to 20 carbons arranged in a linear, branched, or cyclic conformation. In some embodiments, a useful additional monomer is 2-acrylamido-2-methylpropane sulfonic acid or the conjugate base thereof. Other monomers are also usefully incorporated at at amounts of up to 1 wt % of the total monomer composition in the monomer solution.

The monomer solution is formed by dissolving the monomers in water, then adjusting the pH of the water phase prior to initiating polymerization. The pH of the water phase is advantageously adjusted to be about 2.0 to 5.0, or about 2.2 to 5.0, or about 2.4 to 5.0, or about 2.6 to 5.0, or about 2.8 to 5.0, or about 3.0 to 5.0, or about 3.2 to 5.0, or about 3.4 to 5.0, or about 3.6 to 5.0, or about 3.8 to 5.0, or about 2.0 to 4.8, or about 2.0 to 4.6, or about 2.0 to 4.4, or about 2.0 to 4.2, or about 2.0 to 4.0, or about 3.0 to 4.5, or about 3.5 to 4.5, or about 3.7 to 4.3, or about 3.7 to 4.0. pH adjustment agents suitably added to the monomer solution to reduce pH include organic or inorganic protic acids capable of providing the target pH that are otherwise unreactive in the monomer solution. While many protic acids are useful in forming a low pH monomer solution, acids known to ionize 100% in water are preferable from an efficiency standpoint, since less is required to reach the target pH. Examples of suitable protic acids include hydrochloric acid, hydroiodic acid, hydrobromic acid, perchloric acid, nitric acid, and sulfuric acid. Other pH adjustment agents are suitably added to the monomer solution to increase pH to the target value; such compounds include sodium hydroxide or other monovalent metal hydroxides. The compounds added to the monomer solution to reduce or increase pH are suitably added neat or in a waterbased solution, for example a 20 wt % to 50 wt % solution of the agent or combination thereof in water.

One or more additional agents are optionally added to the monomer solution, during or after formation thereof. Buffers, salts, chain transfer agents, and chelators are examples of additional agents suitably added to the monomer solution. Such agents are added at suggested use levels. Suitable chain transfer agents include but are not limited to water soluble compounds such as sodium hypophosphite. Suitable chelators include but are not limited to tetrasodium ethylenediaminetetraacetic acid (EDTA).

After the monomer solution formed, polymerization is initiated. One of skill will recognize that the polymerization step is generally carried out according to conventional polymerization procedures and using standard free-radical initiators such as any of those found in the art that are at least partially soluble in water. While not limited thereto, free radical and redox type chain reaction methodologies are advantageously employed in some embodiments due to the known cost efficiency and ability to form very high molecular weight species associated with such techniques. In some embodiments, the monomer solution is heated to initiate polymerization. In other embodiments, the polymerization is carried out adiabatically. Suitable adiabatic polymerization techniques are described, for example, by Thomson, R. A. M., *J. Chem. Educ.*, 1986, 63 (4), p 362. In some embodiments, adiabatic polymerization is carried out at atmospheric pressure.

In some embodiments, free radical polymerization is suitably initiated by adding a compound that decomposes homolytically to result in a free radical, which then proceeds to react with the unsaturated site of a monomer and initiate polymerization. Non-limiting examples of thermal free radical initiators include inorganic peroxides such as potassium persulfate or hydrogen peroxide. Redox polymerization is an alternative technique employing a single electron transfer reaction that has found wide application for initiating w/o latex polymerizations. Redox reactions are incurred by reduction of e.g. hydrogen peroxide or an alkyl hydrogen peroxide by $Fe^{2+}$, $Cr^{2+}$, $V^{2+}$, $Ti^{3+}$, $Co^{2+}$, or $Cu^{2+}$ salts. Examples of suitable redox systems include t-butylhydroperoxide/ferrous ion; ammonium persulfate/sodium bisulfite; and t-butylhydroperoxide/sodium metabisulfite. In some embodiments, the initiator(s) are dissolved in water and added to the monomer solution at elevated temperature to initiate the polymerization.

The polymerization reaction is carried out for a sufficient amount of time to reach PAMAA weight-average molecular weights ($M_w$) of at least about $1 \times 10^5$ g/mol. This threshold molecular weight provides sufficient chain length to impart a desirable increase in viscosity when the polymer is diluted and ionically crosslinked for use in one or more EOR applications, for example. In embodiments, the $M_w$ of the polymer compositions is about $1 \times 10^5$ g/mol to $1 \times 10^8$ g/mol g/mol, or about $5 \times 10^5$ g/mol to $5 \times 10^7$ g/mol g/mol, or about $1 \times 10^6$ g/mol to $1 \times 10^7$ g/mol g/mol, or about $5 \times 10^6$ g/mol to $1 \times 10^7$ g/mol.

Upon completion of polymerization, the monomer solution is transformed to a polymer solution. The polymer solution is characterized as comprising PAMAA having a mole ratio of AM and AA repeat units corresponding substantially to the ratio of AM and AA in the monomer solution. That is, the copolymerization conditions are sufficiently mild such that no hydrolysis of acrylamide amide groups to carboxylate groups is observed. Thus, the PAMAA present in the polymer solution comprises about 50 mol % to 99 mol % AM, or about 55 mol % to 99 mol % AM, or about 60 mol % to 99 mol % AM, or about 65 mol % to 99 mol % AM, or about 70 mol % to 99 mol % AM, or about 50 mol % to 95 mol % AM, or about 50 mol % to 90 mol % AM, or about 50 mol % to 85 mol % AM, or about 50 mol % to 80 mol % AM, or about 50 mol % to 75 mol % AM, or about 50 mol % to 70 mol % AM, or about 55 mol % to 80 mol % AM, or about 60 mol % to 75 mol % AM, or about 65 mol % to 75 mol % AM. In some embodiments, the remaining component comprises, consists essentially of, or consists of acrylic acid. In other embodiments, up to 1 wt % of the copolymer weight includes the residue of a third monomer as discussed above.

In some embodiments, the polymer solutions are solid-like and/or gel-like and cannot be effectively stirred using standard mixing or stirring methodology familiar to those of skill Such polymer solutions are termed "polymer gels". In some embodiments, the polymer solution is a polymer gel that is stored as-is for dilution and crosslinking at a targeted use site, such as on or proximal to a hydrocarbon-bearing subterranean formation. In other embodiments, the polymer solution is subjected to one or more post-treatments prior to transporting or storing the polymer at a targeted use site. Suitable post-treatments include, for example, neutralizing, granulating, drying, and comminution.

Neutralizing is optionally carried out where a target pH other than the initial polymer solution pH is desirable for transport/storage or for further crosslinking reactions. Neutralization is suitably carried out by addition of a pH adjusting agent to the polymer solution, that is, one or more of the pH adjustment agents employed above in formation of the monomer solution are also suitably employed to reach a targeted pH of the polymer solution. In some embodiments, the target pH of the neutralized polymer solution is about 5 to 11, for example about 5 to 10, or about 5 to 9, or about 5 to 8, or about 6 to 11, or about 7 to 11, or about 6 to 10, or about 6 to 9, or about 6 to 8, or about 7.

Granulating of a polymer gel to form gel granules is carried out using any of the known devices for masticating wet, elastic and/or gel-like materials; such devices include e.g. meat grinders, screw extruders, and other masticating or grinding devices. In some embodiments, one or more additional post-treatments are combined with granulation, since the granulation offers an opportunity to mix or distribute one or more materials into the polymer gel as it is divided into gel granules. In some embodiments, for example, the polymer gel is granulated and a pH adjustment agent is added during granulation in order to distribute and/or mix the pH adjustment agent with the gel to reach the target pH throughout the polymer solution. In some embodiments, an oil or other lubricating agent is added to the polymer gel during granulation to prevent blocking (re-adhesion) of the gel granules. In some embodiments, both a pH adjustment agent and a lubricating agent are added to the polymer gel during granulation. In some embodiments, one or more such agents are added to the gel granules after the granulation, such as by spraying the agent onto the divided gel granules.

Drying of the polymer solution is suitably carried out using any method known to those of skill for removing water from a polymer solution. Temperatures of up to 100° C., optionally employing a vacuum or means of exhaust, are examples of suitable drying conditions. A dry polymer is characterized as having 0 to about 15 wt % water content. In some embodiments, drying of gel granules results in a dry granulated polymer having a particle size of about 1 μm to 10 mm.

Optional comminution of dry granulated polymer results in a polymer powder characterized by an average particle size of about 100 nm to 1 mm. In some embodiments, comminution is carried out to reduce the average particle size, for example from greater than 1 mm to less than 1 mm. Useful comminution devices include cutting mills, beater mills, ball mills, grinding mills, jet mills, pulverizers, granulators, hammer mills, attrition mills, roll mills, and the like. In some embodiments, after comminution, sieving or other methods of narrowing the average particle size dispersity of the granules or powder are carried out on the polymer powder; particle sizes that are larger than the desired maximum are optionally subjected to further comminution.

Polymer powders and dry granulated polymers are usefully stored nearly indefinitely. After they are transported to the use location, they are added to a water source and optionally crosslinked using one or more ionic crosslinkers to form a polymer solution on site for injection into one or more subterranean hydrocarbon-bearing reservoirs.

Low pH Latex Polymerization

Alternatively to forming the copolymers via solution polymerization, it is possible to carry out the low pH copolymerization of AM and AA in the water phase of a water-in-oil (w/o) latex. The latices are shelf stable during low pH polymerization, subsequent neutralization, and storage of the neutralized latices. The latices comprise, consist essentially of, or consist of an oil phase and a water phase.

In some embodiments, the water phase comprises, consists essentially of, or consists of a blend of AM and AA in water. In various embodiments, the water phase is about 40 wt % to 90 wt % of the total weight of the w/o latex, or about 45 wt % to 90 wt %, or about 50 wt % to 90 wt %, or about 55 wt % to 90 wt %, or about 60 wt % to 90 wt %, or about 40 wt % to 85 wt %, or about 40 wt % to 80 wt %, or about 40 wt % to 75 wt %, or about 40 wt % to 70 wt %, or about 50 wt % to 80 wt %, or about 55 wt % to 75 wt % of the total weight of the w/o latex. In some embodiments, the total monomer concentration in the water phase is about 50 wt % to 95 wt % of the total weight of the water phase, or about 55 wt % to 95 wt %, or about 60 wt % to 95 wt %, or about 65 wt % to 95 wt %, or about 70 wt % to 95 wt %, or about 50 wt % to 90 wt %, or about 50 wt % to 85 wt %, or about 50 wt % to 80 wt %, or about 50 wt % to 75 wt %, or about 60 wt % to 90 wt %, or about 60 wt % to 85 wt %, or about 60 wt % to 80 wt % of the total weight of the water phase of the w/o latex. In some embodiments, the molar ratio of AM:AA in the water phase is about 50:50 to 99:1, or about 55:45 to 99:1, or about 60:40 to 99:1, or about 65:35 to 99:1, or about 70:30 to 99:1, or about 50:50 to 98:2, or about 50:50 to 97:3, or about 50:50 to 96:4, or about 50:50 to 95:5, or about 50:50 to 90:10, or about 50:50 to 85:15, or about 50:50 to 80:20, or about 60:40 to 70:30, or about 60:40 to 95:5, or about 60:40 to 97:3, or about 70:30 to 95:5, or about 70:30 to 97:3.

In some embodiments, AM and AA make up substantially the entire monomer complement in the w/o latex. In other embodiments, up to 1 wt % of one or more additional monomer(s) are suitably included in the w/o latex, based on the total weight of monomer included in the latex. For example about 0.001 wt % to 1.00 wt %, or about 0.01 wt % to 1.00 wt %, or about 0.1 wt % to 1.00 wt %, or about 0.2 wt % to 1.00 wt %, or about 0.3 wt % to 1.00 wt %, or about 0.4 wt % to 1.00 wt %, or about 0.5 wt % to 1.00 wt %, or about 0.6 wt % to 1.00 wt %, or about 0.7 wt % to 1.00 wt %, or about 0.8 wt % to 1.00 wt %, or about 0.1 wt % to 0.9 wt %, or about 0.1 wt % to 0.8 wt %, or about 0.1 wt % to 0.7 wt %, or about 0.1 wt % to 0.6 wt %, or about 0.1 wt % to 0.5 wt % of one or more additional monomer(s) are suitably included in the w/o latex, based on the total weight of monomer included in the latex. In some embodiments, a useful additional monomer includes a long-chain hydrocarbyl functionality intended to produce physical or associative crosslinking in a waterbased polymer solution. Such hydrophobically associating moieties are well known in the industry. In some embodiments, the hydrocarbyl functionality includes 8 to 20 carbons, or 10 to 20 carbons, or 12 to 20 carbons arranged in a linear, branched, or cyclic conformation. In some embodiments, a useful additional monomer is 2-acrylamido-2-methylpropane sulfonic acid or the conjugate base thereof. Other monomers are also usefully incorporated at at amounts of up to 1 wt % of the total monomer composition in the w/o latex.

The water phase of the w/o latex is formed by dissolving the monomers in water, then adjusting the pH of the water phase prior to adding additional latex components. The pH of the water phase is advantageously adjusted to be about 2.0 to 5.0, or about 2.2 to 5.0, or about 2.4 to 5.0, or about 2.6 to 5.0, or about 2.8 to 5.0, or about 3.0 to 5.0, or about 3.2 to 5.0, or about 3.4 to 5.0, or about 3.6 to 5.0, or about 3.8 to 5.0, or about 2.0 to 4.8, or about 2.0 to 4.6, or about 2.0 to 4.4, or about 2.0 to 4.2, or about 2.0 to 4.0, or about 3.0 to 4.5, or about 3.5 to 4.5, or about 3.7 to 4.3, or about 3.7 to 4.0, or about 3.7 to 3.9, or about 3.7 to 3.8. Compounds suitably added to the water phase to reduce pH include protic acids capable of providing the target pH and is unreactive otherwise in the w/o latex. While many protic acids are useful in forming a low pH water phase, acids known to ionize 100% in water are preferable from an efficiency standpoint, since less is required to reach the target pH. Examples of suitable protic acids include hydrochloric acid, hydroiodic acid, hydrobromic acid, perchloric acid, nitric acid, and sulfuric acid. Other compounds suitably added to the water phase to increase pH to the target value include sodium hydroxide or other monovalent metal hydroxides. The compounds added to the water phase to reduce or increase pH are suitably added neat or in a waterbased solution, for example a 20 wt % to 50 wt % solution of the compound in a water source.

One or more additional agents are suitably added to the water phase, during or after formation thereof. Buffers, salts, chain transfer agents, and chelators are examples of additional agents suitably added to the water phase. Such agents are added at suggested use levels or at levels determined by the target water source to be used to dilute the latices to their final concentration in the field. Suitable chain transfer agents include but are not limited to water soluble compounds such as sodium hypophosphite. Suitable chelators include but are not limited to tetrasodium ethylenediaminetetraacetic acid (EDTA).

The oil phase of the w/o latex is formed separately for addition to the water phase. The oil phase includes a hydrocarbon solvent and one or more surfactants. In embodiments, the hydrocarbon surfactant is present in the oil phase at about 60 wt % to 99 wt % of the total weight of the oil phase, or about 65 wt % to 99 wt %, or about 70 wt % to 99 wt %, or about 75 wt % to 99 wt %, or about 80 wt % to 99 wt %, or about 85 wt % to 99 wt %, or about 90 wt % to 99 wt %, or about 95 wt % to 99 wt %, or about 97 wt % to 99 wt %, or about 60 wt % to 98 wt %, or about 60 wt % to 97 wt %, or about 60 wt % to 96 wt %, or about 60 wt % to 95 wt %, or about 80 wt % to 98 wt %, or about 85 wt % to 98 wt %, or about 90 wt % to 98 wt %, or about 90 wt % to 97 wt %, or about 90 wt % to 96 wt %, or about 90 wt % to 95 wt % of the total weight of the oil phase. The hydrocarbon solvent is any compound or blend of compounds that is liquid at 20° C. or lower includes substantially only hydrogen and carbon. Generally, hydrocarbons having between 4 and 20 carbons are useful as the hydrocarbon solvent or in a blend of compounds that together form the hydrocarbon solvent for the oil phase. Aromatic, aliphatic, and aralkyl compounds such as linear, branched or cyclic alkanes, alkenes, alkynes, aralkyl compounds, and the like are suitably employed in the oil phase. Paraffin oils or solvents, which are blends of petroleum distillates having a stated boiling range, are examples of useful solvents for the oil phase. Suitable solvents include but are not limited to dearomatized kerosene fractions such as KETRUL® D80, sold by Total S.A. of Houston, Tex. In some embodiments, the solvent is not flammable at temperatures of about 50° C. to 90° C.

In some embodiments, the oil phase comprises, consists essentially of, or consists of the hydrocarbon solvent(s) and one or more surfactants. In embodiments, the surfactant employed in the oil phase comprises, consists essentially of, or consists of a surfactant blend of two or more surfactants, or three or more surfactants. In embodiments, the surfactant or surfactant blend comprises, consists essentially of, or consists of one or more nonionic surfactants. Examples of useful nonionic surfactants include those having linear ethylene glycol, propylene glycol, or both glycol units in a short (2-20 repeat units) chain bonded to a linear, branched, cyclic, alicyclic, aromatic, or alkaryl hydrocarbon group via an ether, ester, or amide linkage. In some embodiments, one or more moieties derived from a sugar or a sugar alcohol are present in the nonionic surfactant. Examples of useful nonionic surfactants include those having 4-10 ethoxylate groups bonded to a sorbitol moiety which in turn is bonded to a fatty acid, such as ethoxylated sorbitan monooleate and ethoxylated sorbitan monostearate. Other useful nonionic surfactants include a linear, branched, cyclic, alicyclic, aromatic, or alkaryl hydrocarbon group bonded to one or more moieties derived from a sugar molecule; examples include sorbitan monostearate, sorbitan monooleate, and sorbitan monoisostearate.

In some embodiments, the surfactant or surfactant blend comprises, consists essentially of, or consists of a polymeric nonionic surfactant. In some such embodiments, the polymeric nonionic surfactant comprises, consists essentially of, or consists of a poly(ethylene glycol) ester of a fatty acid or a long-chain hydrocarbon acid having about 10 to 30, or about 12 to 26, or about 12 to 20, or about 14 to 20, or about 16 to 20 carbons. In some embodiments, the polymeric nonionic surfactant is branched. In some embodiments the polymeric nonionic surfactant is hyperbranched. In some embodiments, the branched or hyperbranched polymeric nonionic surfactant comprises, consists essentially of, or consists of one or more poly(ethylene glycol) branches and one or more fatty acid or long-chain hydrocarbon branches.

In some embodiments, the polymeric nonionic surfactant is a block copolymer. Block copolymers include those having one or more hydrophilic or water-soluble blocks and one or more hydrophobic or oil-soluble blocks, with the proviso that there is at least two hydrophilic blocks or two hydrophobic blocks. In some embodiments, the block copolymer includes one or more ester linkages between one or more blocks. Block copolymers wherein A is hydrophilic block and B is a hydrophobic block are usefully employed where linear triblock ABA or BAB, tetrablock ABAB, pentablock ABABA or BABAB, or higher order structures are employed. In some embodiments, the block copolymer is also branched or hyperbranched, with branches formed from one or more A blocks, B blocks, or both. In some embodiments, three or more different block structures (thus, polymers including one or more A, B, and C blocks for example) are employed in conjunction with the overall block copolymer structures described above. In some embodiments, one or more blocks are branched structures. In some embodiments, one or more hydrophilic (A) blocks comprise, consist essentially of, or consist of about 2 to 100 ethylene oxide repeat units, or about 4 to 50, 2 to 50, 2 to 40, or 4 to 40 ethylene oxide repeat units. In some embodiments, one or more hydrophobic (B) blocks comprise, consist essentially of, or consist of repeat units derived from the condensation of one or more hydroxyacids, wherein the hydroxyacids include a linear, branched, cyclic, or alicyclic hydrocarbon moiety having about 10 to 30 carbons. In some such embodiments, the hydroxyacid is 12-hydroxystearic acid (12-hydroxyoctadecanoic acid). In some embodiments, the block copolymer has an HLB (hydrophilic-lipophilic balance) of about 4 to 6, or about 4.5 to 6, or about 4.5 to 5.5, or about 4.6 to 5.4, or about 4.7 to 5.3, or about 4.8 to 5.2.

Useful block copolymer surfactants include those manufactured by Croda International PLC of Yorkshire, United Kingdom under the trade name HYPERMER®. One example of a useful surfactant is HYPERMER® 2524. In some embodiments, the surfactant is a blend of one or more block copolymers and one or more conventional nonionic surfactant(s). Conventional nonionic surfactants include the non-polymeric surfactants listed above. In some such embodiments, the weight ratio of the block copolymer surfactant to conventional nonionic surfactant employed in the oil phase is about 1:10 to 20:1, or about 1:5 to 20:1, or about 1:2 to 20:1, or about 1:1 to 20:1, or about 1:10 to 18:1, or about 1:10 to 16:1, or about 1:10 to 14:1, or about 1:10 to 12:1, or about 1:10 to 10:1, or about 1:10 to 8:1, or about 1:10 to 6:1, or about 1:10 to 4:1, or about 1:1 to 10:1, or about 1:1 to 8:1, or about 1:1 to 6:1, or about 2:1 to 10:1, or about 2:1 to 8:1, or about 2:1 to 6:1. In some embodiments, the total amount of surfactant (including surfactant blends) in the oil phase is about 0.1 wt % to 10 wt % based on the total weight of the oil phase, or about 0.5 wt % to 10.0 wt %, or about 1.0 wt % to 10.0 wt %, or about 2.0 wt % to 10.0 wt %, or about 3.0 wt % to 10.0 wt %, or about 4.0 wt % to 10.0 wt %, or about 5.0% wt % to 10.0 wt %, or about 6.0 wt % to 10.0 wt %, or about 7.0 wt % to 10.0 wt %, or about 0.1 wt % to 9.9 wt %, or about 0.1 wt % to 9.7 wt %, or about 0.1 wt % to 9.5 wt %, or about 0.1 wt % to 9.0 wt %, or about 0.1 wt % to 8.5 wt %, or about 0.1 wt % to 8.0 wt %, or about 5.0 wt % to 9.5 wt %, or about 7.0 wt % to 9.5 wt %, or about 7.0 wt % to 9.0 wt % of the total weight of the oil phase.

The surfactant or surfactant blend is added to the hydrocarbon solvent with agitation, either neat or in a concentrated solution in the hydrocarbon solvent to be employed in the w/o latex. In some embodiments, the combination of hydrocarbon solvent and surfactant or surfactant blend is heated to dissolve the surfactant. In some such embodiments, the combination is heated to about 30° C. to 60° C. until the surfactant(s) dissolve. A surfactant blend is added by sequentially adding each surfactant to the hydrocarbon solvent or as a formed mixture, depending on convenience of the user and equipment employed to mix the components.

After the water phase and the oil phase are independently formed, the two liquid phases are blended together to form a stable w/o latex. In some embodiments, blending is accomplished by adding the oil phase to the water phase, typically slowly or in aliquots and with efficient mixing using conventional equipment to result in a stable latex. In embodiments, the weight ratio of the water phase:oil phase in the latex after mixing is complete is about 5:1 to 1:1, or about 4.5:1 to 1:1, or about 4.0:1 to 1:1, or about 3.5:1 to 1:1, or about 3.0:1 to 1:1, or about 2.5:1 to 1:1, or about 2:1 to 1:1, or about 5:1 to 1.5:1, or about 5:1 to 2.0:1, or about 5:1 to 2.5:1, or about 5:1 to 3:1, or about 4:1 to 1.5:1, or about 3:1 to 1.5:1, or about 2.5:1 to 1:5:1.

After the stable w/o latex is formed, polymerization is initiated. One of skill will recognize that the polymerization step is generally carried out according to conventional water-in-oil polymerization procedures and using standard free-radical initiators such as any of those found in the art that are at least partially soluble in the water phase. While not limited thereto, free radical and redox type chain reaction methodologies are advantageously employed in some embodiments due to the known cost efficiency and ability to form very high molecular weight species associated with such techniques. Non-limiting examples of thermal and redox initiators are described above for solution polymerization.

The polymerization reaction is carried out in the latex for a sufficient amount of time to reach PAMAA weight-average molecular weights ($M_w$) in the same ranges as observed for PAMAA formed using the solution polymerization discussed above.

After completion of polymerization the stable w/o latex is neutralized to a pH of greater than 5, for example about 5 to 9, or about 5 to 8, or about 5 to 7 or about 6 to 8 or about 6 to 7, by adding a base such as sodium hydroxide to the latex to result in a stable neutralized w/o latex. In some embodiments, the base is dissolved in water prior to addition. In some embodiments, a stabilizing surfactant is added to the base in water to form a neutralization solution; the neutralization solution is added to the w/o latex to form a stable neutralized w/o latex. The neutralization solution is added dropwise, batchwise or in a single addition to the w/o latex to form a neutralized latex. In some embodiments, a solution of about 25 wt % to 50 wt % sodium hydroxide or other monovalent metal hydroxide is formed, and a stabilizing surfactant is added to the solution at about 5 wt % to 10 wt % of the total weight of the neutralization solution. In other embodiments, a stabilizing surfactant is added to the w/o latex, followed by addition of the base in water to form a neutralized w/o latex.

The stabilizing surfactant comprises, consists essentially of, or consists of a nonionic surfactant or blend of two or more nonionic surfactants having an HLB of about 2 to 15, or about 3 to 15, or about 4 to 15, or about 5 to 15, or about 2 to 14, or about 2 to 13, or about 2 to 12, or about 2 to 11, or about 2 to 10, or about 2 to 9, or about 2 to 8, or about 2 to 7, or about 2 to 6, or about 3 to 14, or about 3 to 12, or about 3 to 10, or about 3 to 8, or about 3 to 6, or about 4 to 14, or about 4 to 12, or about 4 to 10, or about 4 to 8, or about 4 to 6. In some embodiments, the stabilizing surfactant includes amide, amine, triglyceride, or ether functionality. In some embodiments, the stabilizing surfactant is a block copolymer including alkylene oxide functionality, such as ethylene oxide or propylene oxide or both. In some embodiments, the stabilizing surfactant is an amide. In some such embodiments, the stabilizing surfactant comprises, consists essentially of, or consists of an N,N-dialkanolamide, such as an N,N-diethanolamide, having a hydrocarbon moiety of about 12 to 30 carbons. Examples of useful N,N-dialkanolamide surfactants include those sold under the trade name AMIDEX® by the Lubrizol Corporation of Wickliffe, Ohio; examples include N,N-diethanololeamide (AMIDEX® O) and N,N-diethanolcocamide (AMIDEX® CE).

The neutralization solution is added to the w/o latex in an amount that results in a pH of about 5 to 9, or about 5 to 8, or about 5 to 7, or about 6 to 8, or about 6 to 7, further wherein the amount of the stabilization surfactant added to the latex is about 1 wt % or less of the total weight of the neutralized latex, for example about 0.1 wt % to 1.0 wt %, or about 0.2 wt % to 1.0 wt %, or about 0.3 wt % to 1.0 wt %, or about 0.4 wt % to 1.0 wt %, or about 0.5 wt % to 1.0 wt %, or about 0.6 wt % to 1.0 wt %, or about 0.1 wt % to 0.9 wt %, or about 0.1 wt % to 0.8 wt %, or about 0.1 wt % to 0.7 wt %, or about 0.1 wt % to 0.6 wt %, or about 0.2 wt % to 0.9 wt %, or about 0.4 wt % to 0.8 wt %, or about 0.4 wt % to 0.7 wt %, or about 0.5 wt % to 0.7 wt % of the the total weight of the neutralized latex.

Neutralization results in a stable neutralized w/o latex having a PAMAA copolymer dispersed therein. We have found that the neutralized latices include a complement of carboxylate groups corresponding to the amount of acrylic acid originally added to the water phase prior to polymerization. That is, the conditions during the copolymerization and neutralization are sufficiently mild such that no hydrolysis of acrylamide amide groups to carboxylate groups is observed.

Polymer latices, including the neutralized latices, are usefully stored and transported to the use location, where they are added to a water source and optionally crosslinked using one or more ionic crosslinkers to form a polymer solution on site for injection into one or more subterranean hydrocarbon-bearing reservoirs.

Inversion of Water-in-oil Latices

Dilution of a w/o polymer latex is also referred to as "inversion." Inversion means both to dilute and destabilize the latex to yield a polymer solution.

For EOR and related applications, neutralized w/o latices are typically inverted to provide a dilute polymer solution having about 100 ppm to 40,000 ppm, for example about 100 ppm to 10,000 ppm polymer. Dilution is suitably accomplished in a single step or in two steps with an intermediate dilution providing for less instability issues during the overall dilution. In some embodiments, inversion is accomplished by adding a water source to the neutralized latex so as to decrease the polymer concentration and incur hydration of the polymer chains. In other embodiments, an inverting surfactant is further added to the latices to stabilize the latex components during the inversion in order to avoid coagulation or precipitation of the polymer. One of skill will appreciate that the neutralized w/o latices formed using the methods of the invention can be inverted employing standard inversion materials and techniques: no special steps or devices are required.

Inversion of the w/o polymer latex results in a dilute polymer solution. Inversion of the w/o polymer latex with a water source comprising one or more ionic crosslinking agents results in a dilute crosslinked solution. In some embodiments, the dilute crosslinked solution is formed in the field during EOR processes, wherein the w/o latex is delivered as the starting material for an oil recovery process and one or more water sources are present to accomplish the inversion. In some embodiments, one or more additional surfactants or inversion aids such as glycerol are added to the water source to facilitate the inversion of the latex to form a dilute polymer solution or dilute crosslinked solution. In some embodiments, an ionic crosslinker as described above is added to the water source used to invert the w/o latex. In such embodiments, the ionic crosslinking agents and methods described above are similarly applied before, during, or after inversion to yield the dilute crosslinked solution.

Dilute crosslinked solutions formed by inversion and crosslinking of w/o latices having PAMAA copolymerized therein at low pH have viscosities that are substantially greater than that obtained by conventional base catalyzed hydrolysis of PAM homopolymers followed by dilution and ionic crosslinking. That is, dissolving a similar molecular weight PAM homopolymer in water and hydrolyzing it to a target mole % carboxylate content that is commensurate with the AA content of a PAMAA polymer synthesized according to the methods of the invention yields a dilute crosslinked solution thereof that is substantially lower in solution viscosity than the dilute crosslinked solutions of the PAMAA copolymers formed using the low pH methodology of the invention.

Ionic Crosslinking

The PAMAA copolymers formed via low pH solution polymerization or low pH latex polymerization, after neutralization, readily undergo ionic crosslinking with an ionic crosslinker. Ionic crosslinkers are salts of multivalent cations. The PAMAA copolymers obtained using a low pH latex or solution polymerization are suitably crosslinked prior to, contemporaneously with, or after dilution thereof with a water source to form a dilute polymer solution. Dilution is carried out in preparation for the intended use of the PAMAA, e.g. injection into an oil-bearing subterranean reservoir. In embodiments, dilute polymer solutions for subterranean oil recovery operations such as hydraulic fracturing or enhanced oil recovery comprise a water source and about 100 ppm to 1500 ppm PAMAA polymer. Dilute polymer solutions are advantageously obtained by adding a water source to a polymer powder, a polymer solution, or a w/o polymer latex, using techniques familiar to those of skill to reach the target polymer concentration and also provide a fully hydrated polymer for maximum ionic crosslinking efficiency.

In some embodiments, one or more ionic crosslinkers are added to a dilute polymer solution to form a dilute crosslinked solution. In other embodiments, one or more ionic crosslinkers are added to the w/o latex or the polymer solution, followed by addition of a water source to form the dilute crosslinked solution. In still other embodiments, ionic crosslinking of the PAMAA copolymers is carried out by diluting a PAMAA polymer solution or w/o latex with a water source containing an ionic crosslinker, wherein the amount of the ionic crosslinker in the water source is selected to provide the targeted amount of crosslinker in the dilute crosslinked solution at the targeted polymer concentration.

Ionic crosslinkers are ionic compounds bearing a divalent or multivalent cation, further wherein the ionic compound is capable of dissociating in water. Suitable ionic crosslinking agents include salts of multivalent cations including but not limited to $Ca^{2+}$, $Mg^{2+}$, $Zn^{2+}$, $Cr^{2+}$, $Cr^{3+}$, and $Al^{3+}$ as well as combinations of two or more thereof. The counterion(s) employed in conjunction with the multivalent cations is not particularly limited. In some embodiments organic counterions are usefully employed. Examples of suitable organic counterions include acetate, lactate, oxalate, maleate, succinate, glutarate, and citrate. In some embodiments inorganic counterions are usefully employed. Examples of suitable inorganic counterions include phosphonate, sulfonate, carbonate, halide such as chloride or bromide, and the like. Thus, for example, a solution of calcium oxalate, zinc chloride, magnesium acetate, and/or aluminum citrate in water is contacted with PAMAA before, contemporaneously with, or after dilution, to result in a dilute crosslinked solution.

It is a feature of the invention that the viscosity of the dilute crosslinked solutions are substantially higher than viscosity obtained by ionically crosslinking a dilute solution of hydrolyzed PAM homopolymer of the same or similar molecular weight. We have found that copolymerization conducted at low pH results in a distribution of carboxylate moieties that is more randomized than the distribution of carboxylate moieties obtained by hydrolysis of a PAM homopolymer. Without wishing to be limited by theory, we believe that this randomized distribution results in maximum crosslinking efficiency and thus maximum viscosification at the selected level of crosslinking.

In embodiments, the randomized distribution of the copolymers of the invention is manifested in the "blockiness" of the polymer, measured using triad analysis of monomer distribution in the polymer. Blockiness index is a summarized analysis of the triad distribution which provides an indication of how blocky, random, or alternating a copolymer may be based on the triad distribution: block copolymers result in a blockiness index value of 0.0; alternating copolymers a value of 2.0; ideally random copolymers are 1.0. The copolymerization conducted at low pH results in an acrylamide/acrylic acid copolymer having a blockiness index of about 0.90 to 1.1, or about 0.91 to 1.1 or about 0.92 to 1.1, or about 0.93 to 1.1 or about 0.94 to 1.1, or about 0.95 to 1.1, or about 0.96 to 1.1, or about 0.97 to 1.1, or about 0.90 to 1.09, or about 0.90 to 1.08, or about 0.90 to 1.07, or about 0.90 to 1.06, or about 0.90 to 1.05, or about 0.90 to 1.04, or about 0.90 to 1.03, or about 0.90 to 1.02, or about 0.90 to 1.01, or about 0.90 to 1.00, or about 0.92 to 1.08, or about 0.94 to 1.08, or about 0.94 to 1.05, or about 0.95 to 1.08, or about 0.95 to 1.07, or about 0.95 to 1.05, or about 0.95 to 1.04, or about 0.95 to 1.03, or about 0.95 to 1.02, or about 0.95 to 1.01, or about 0.95 to 1.00. Notably, copolymerization at neutral pH and post-hydrolyzed PAM homopolymers have blockiness indices of greater than 1.1, for example about 1.12 to 1.50.

In embodiments, the amount of ionic crosslinker is selected to provide a target viscosity of the dilute crosslinked solution. The target viscosity is selected by determining the viscosity of the petroleum product in the reservoir, wherein the target viscosity that is the same or similar to the viscosity of the petroleum product. Thus, the concentration, degree of crosslinking, molecular weight of the PAMAA copolymer, and the like in turn dictate the ideal concentration of PAMAA copolymer in the polymer flooding solution.

In some embodiments, the amount of ionic crosslinker is selected to be about 1 wt % to 10 wt % based on the weight of the PAMAA copolymer addressed. Thus, for example, a dilute crosslinked solution comprising about 500 ppm (0.05 wt %) PAMAA also comprises about 5 to 50 ppm ionic crosslinker. Similarly, a dilute crosslinked solution comprising or about 1000 ppm (0.10 wt %) PAMAA also comprises about 10 to 100 ppm ionic crosslinker. In some embodiments, the amount of ionic crosslinker is selected to be between about 10:1 to 50:1 wt:wt of polymer:ionic crosslinker. Upon contacting PAMAA with an ionic crosslinker, full crosslinking and thus peak solution viscosity of the dilute crosslinked solutions is reached in about 1 hour to 10 days; the amount of time to reach peak viscosity will depend on the processing methodology, temperature, and polymer concentration in the dilute crosslinked solution.

In embodiments, a dilute crosslinked solution including 25 ppm of aluminum citrate (ionic crosslinker) and 500 ppm of a polymer in water, the polymer formed according to the methods of the invention and having a reduced specific viscosity of about 30 dL/g to 40 dL/g, has a viscosity at 25° C. of about 100 cP to 500 cp, or about 150 cP to 300 cP. In embodiments, a dilute crosslinked solution including 600 ppm of the polymer and 30 ppm of aluminum citrate has a viscosity at 25° C. of about 150 cP to 500 cp, or about 200 cP to 400 cP. In embodiments, a dilute crosslinked solution including 800 ppm of the polymer and 40 ppm of aluminum citrate has a viscosity at 25° C. of about 400 cP to 1000 cp, or about 500 cP to 800 cP. In embodiments, a dilute crosslinked solution including 1000 ppm of the polymer and 50 ppm of aluminum citrate has a viscosity at 25° C. of about 700 cP to 2000 cp, or about 800 cP to 1500 cP. In embodiments, a dilute crosslinked solution including 1200 ppm of the polymer and 60 ppm of aluminum citrate has a viscosity at 25° C. of about 1000 cP to 2000 cp, or about 1400 cP to 2000 cP.

In embodiments, a dilute crosslinked solution including 15 ppm of aluminum citrate (crosslinker) and 600 ppm of a polymer in water, the polymer formed according to the methods of the invention and having a reduced specific viscosity of about 30 dL/g to 40 dL/g, has a viscosity at 25° C. of about 15 cP to 100, or about 15 cP to 60 cP. In embodiments, a dilute crosslinked solution including 800 ppm of the polymer and 20 ppm of aluminum citrate has a viscosity at 25° C. of about 50 cP to 200 cp. In embodiments, a dilute crosslinked solution including 1000 ppm of the polymer and 25 ppm of aluminum citrate has a viscosity at 25° C. of about 100 cP to 500 cp, or about 100 cP to 300 cP. In embodiments, a dilute crosslinked solution including 1200 ppm of the polymer and 30 ppm of aluminum citrate has a viscosity at 25° C. of about 150 cP to 1000 cp, or about 200 cP to 700 cP.

The peak viscosity of the dilute crosslinked solution is at least about 2 times (twice, or 2×) the viscosity of the corresponding dilute polymer solution, for example about 2× to 1000×, or about 2× to 500×, or about 5× to 500×, or about 10× to 500×, or about 2× to 400×, or about 2× to 300×, or about 2× to 200×, or about 2× to 100×, or about 2× to 50×, or about 10× to 300×, or about 10× to 100×, or about 10× to 50× the viscosity of the dilute polymer solution. One of skill will appreciate that viscosity difference between the dilute polymer solution and the dilute crosslinked solution depends on the amount of copolymer present, amount of acrylic acid in the copolymer, the type and amount of crosslinking agent employed, and other factors such as temperature and type and amount of solids dissolved in the water source used to form the dilute polymer solution or dilute crosslinked solution.

In some embodiments, peak viscosity comparison is made between a dilute crosslinked solution having about 100 ppm to 1500 ppm of the copolymer synthesized at low pH and 40:1 wt:wt polymer: trivalent cationic crosslinker, and the same dilute crosslinked solution except that the copolymer is synthesized at neutral pH. In such comparisons, the copolymer synthesized at low pH has a solution viscosity that is at least 100% (2×) greater, for example about 100% to 500% greater than the solution viscosity of the copolymer formed from the neutral pH synthesis at least at one concentration in the stated range. In some embodiments, peak viscosity comparison is made between a dilute crosslinked solution having about 100 ppm to 1500 ppm of the copolymer synthesized at low pH and 40:1 wt:wt polymer: trivalent cationic crosslinker, and the same dilute crosslinked solution except that the copolymer is synthesized by post-hydrolysis of a PAM homopolymer. In such comparisons, the copolymer synthesized at low pH has a solution viscosity that is about 40% to 500% greater than the solution viscosity of the copolymer formed from the neutral pH synthesis at least at one concentration in the stated range.

In some embodiments, peak viscosity comparison is made between a dilute crosslinked solution having about 100 ppm to 1500 ppm of the copolymer synthesized at low pH and 20:1 wt:wt polymer: trivalent cationic crosslinker, and the same dilute crosslinked solution except that the copolymer is synthesized at neutral pH. In such comparisons, the copolymer synthesized at low pH has a solution viscosity that is at least 50% greater, for example about 50% to 500% greater than the solution viscosity of the copolymer formed from the neutral pH synthesis at least at one concentration in the stated range. In some embodiments, peak viscosity comparison is made between a dilute crosslinked solution having about 100 ppm to 1500 ppm of the copolymer synthesized at low pH and 20:1 wt:wt polymer: trivalent cationic crosslinker, and the same dilute crosslinked solution except that the copolymer is synthesized by post-hydrolysis of a PAM homopolymer. In such comparisons, the copolymer synthesized at low pH has a solution viscosity that is about 50% to 500% greater than the solution viscosity of the copolymer formed from the neutral pH synthesis at least at one concentration in the stated range.

EXPERIMENTAL

Example 1

A water-in-oil latex was formed using the components shown in Table 1.

TABLE 1

Components of a w/o latex polymerization of AM and AA.

| Composition | Material | Wt % |
|---|---|---|
| Oil Phase | KETRUL ® D80 (TOTAL Special Fluids of Casablanca, Morocco) | 25.72 |
|  | Sorbitan monooleate | 0.31 |
|  | POE (4) Sorbitan monostearate (Polysorbate 61) | 1.24 |
|  | Tween 61 | 0.67 |
| Water Phase | Acrylamide (50.24% in water) | 38.95 |
|  | Acrylic Acid | 8.23 |
|  | DI Water | 12.43 |
|  | Sodium chloride | 2.07 |
|  | Sodium hypophosphite | 0.002 |
|  | Sodium hydroxide | 0.835 |
|  | EDTA | 0.0092 |
| Initiators | Sodium metabisulfite | 0.018 |
|  | t-Butyl hydroperoxide | 0.13 |
| Post-Treatment | N,N-diethanololeamide | 0.62 |
|  | Sodium hydroxide | 8.27 |
|  | Ammonium thiocyanate | 0.52 |

A latex was formed by mixing the components of the water phase and oil phase separately, then combining them in a reaction vessel with vigorous stirring using an overhead paddle blade mixer followed by sparging of the latex with nitrogen. The pH of the water phase was measured to be 3.7. After mixing was complete, the initiator composition was added to the vessel and the vessel was sealed. The contents of the vessel were heated to about 40° C. with stirring for about 4 hours. Then the post-treatment materials were added to the vessel. The resulting neutralized w/o latex was stable after cooling to ambient laboratory temperature and showed no sign of destabilization (separation, coagulum formation) during the procedure. The latex was observed to be shelf stable in ambient laboratory conditions.

The reduced specific viscosity (RSV) of the latex is 36 dL/g, as measured at 450 ppm polymer concentration in 1M sodium nitrate solution using an Ubbelohde semimicro dilution viscometer, size 75, held at 30° C.

An aliquot of the latex was removed from the vessel after the neutralization and was subjected to $^{13}C$ NMR. The ratio of carboxamide:carboxylate content of the composition was determined to be about 70:30, which reflects the molar ratio of acrylamide:acrylic acid monomers added to the water phase.

A portion of the latex was diluted to the concentrations indicated in Table 3 using an aluminum citrate solution in 1% NaCl. Initial viscosity of the diluted latex was measured with an Anton-Paar MCR302 rheometer using double-gap concentric cylinder geometry held constant at 25° C. The results are reported in Table 3. The reported viscosities were taken at 10 s$^{-1}$ from shear sweeps taken between 1-1000 s$^{-1}$. After the initial viscosity was characterized, the dilute solutions were held at 50° C. for five (5) days in a convection oven before cooling to room temperature and remeasuring viscosity. These results are also shown in Table 3.

Example 2

A water-in-oil latex including the materials shown in Table 2 was formed using the same procedure as outlined above for Example 1.

TABLE 2

Components of a w/o latex polymerization of AM and AA.

| Composition | Material | Wt % |
|---|---|---|
| Oil Phase | KETRUL ® D80 (TOTAL Special Fluids of Casablanca, Morocco) | 25.72 |
|  | Sorbitan monooleate | 0.31 |
|  | POE (4) Sorbitan monostearate (polysorbate 61) | 1.24 |
|  | Tween 61 | 0.67 |
| Water Phase | Acrylamide (50.24% in water) | 38.95 |
|  | Acrylic Acid | 8.23 |
|  | DI Water | 12.43 |
|  | sodium chloride | 2.07 |
|  | sodium hypophosphite | 0.002 |
|  | Sodium hydroxide | 9.10 |
|  | EDTA | 0.0092 |
| Initiators | Sodium metabisulfite | 0.018 |
|  | tert-butyl hydroperoxide | 0.13 |
| Post-Treatment | Ammonium thiocyanate | 0.52 |

The resulting w/o latex was stable after cooling to ambient laboratory temperature and showed no sign of destabilization (separation, coagulum formation) during the procedure.

The reduced specific viscosity (RSV) of the latex was 30 dL/g, measured according to the procedure of Example 1.

A portion of the latex was diluted to the concentrations indicated in Table 3 using an aluminum citrate solution in 1% NaCl, and initial and 5 day/50° C. aged viscosities were measured according to the procedure of Example 1. Results are shown in Table 3.

Example 3

EOR360 was obtained from obtained from TIORCO of Denver, Colo. EOR360 is a PAM homopolymer that is post-hydrolyzed to yield a 70/30 mol/mol acrylamide/acrylic acid functionality ratio.

The reduced specific viscosity (RSV) of the polymer was 45 dL/g, measured according to the procedure of Example 1.

The polymer was diluted to the concentrations indicated in Table 3 using an aluminum citrate solution in 1% NaCl, and initial and 5 day/50° C. viscosities were measured according to the procedure of Example 1. Results are shown in Table 3.

Example 4

EOR380 was obtained from obtained from the TIORCO of Denver, Colo., IL. EOR380 is a 70/30 mol/mol acrylamide/acrylic acid copolymer formed at neutral pH.

RSV of the polymer was 37 dL/g, measured according to the procedure of Example 1.

The polymer was diluted to the concentrations indicated in Table 3 using an aluminum citrate solution in 1% NaCl, and initial and final viscosities after aging for 5 days at 50° C. were measured according to the procedure of Example 1. Results are shown in Table 3.

TABLE 3

Initial and final viscosity measured after 5 days at 50° C. for the indicated polymers, diluted to the indicated concentrations and with the indicated amount of aluminum citrate.

| Example No. | Polymer (ppm) | Al citrate (ppm) | Viscosity at 25° C. (cP) t = 0 | Viscosity at 25° C. (cP) t = 5 days | Difference (% change from t = 0) |
|---|---|---|---|---|---|
| 1 | 300 | 15 | 4.0 | 12.3 | 210% |
|   | 400 | 20 | 5.4 | 24.9 | 365% |
|   | 500 | 25 | 7.2 | 188.1 | 2520% |
|   | 600 | 30 | 9.2 | 275.1 | 2884% |
|   | 800 | 40 | 14.5 | 690.7 | 4650% |
|   | 1000 | 50 | 20.8 | 1014.0 | 4770% |
|   | 1200 | 60 | 28.6 | 1527.0 | 5241% |
| 2 | 300 | 15 | 3.8 | 2.8 | −25% |
|   | 400 | 20 | 5.1 | 4.3 | −17% |
|   | 500 | 25 | 6.8 | 5.6 | −18% |
|   | 600 | 30 | 8.5 | 8.4 | −1% |
|   | 800 | 40 | 12.7 | 13.0 | 3% |
|   | 1000 | 50 | 17.9 | 20.3 | 13% |
|   | 1200 | 60 | 24.2 | 27.9 | 15% |
| 3 | 300 | 15 | 4.8 | 13.1 | 172% |
|   | 400 | 20 | 6.8 | 24.6 | 262% |
|   | 500 | 25 | 9.0 | 24.5 | 173% |
|   | 600 | 30 | 13.2 | 177.2 | 1246% |
|   | 800 | 40 | 19.2 | 141.9 | 638% |
|   | 1000 | 50 | 26.9 | 1143.9 | 4159% |
|   | 1200 | 60 | 33.9 | 1468.5 | 4237% |
| 4 | 300 | 15 | 3.7 | 3.5 | −5% |
|   | 400 | 20 | 5.0 | 4.7 | −5% |
|   | 500 | 25 | 6.5 | 6.2 | −4% |
|   | 600 | 30 | 8.2 | 7.8 | −5% |
|   | 800 | 40 | 12.0 | 11.5 | −4% |
|   | 1000 | 50 | 16.7 | 16.1 | −4% |
|   | 1200 | 60 | 22.0 | 21.0 | −5% |

Example 5

The procedure for dilution followed by 5 days storage in a convection oven at 50° C. was repeated for the latex of Example 1 and the polymers of Examples 3-4, except that the diluted polymer concentrations of 300 ppm, 400 ppm, 500 ppm, 600 ppm, 800 ppm, 1000 ppm, and 1200 ppm were formed using a constant weight ratio of 20:1 polymer to aluminum citrate. Results are shown in Table 4. Also shown in Table 4 is the storage modulus, G', as a function of the same concentrations, wherein G' was recorded at 1.0 s$^{-1}$ frequency, 2% applied strain at 25° C. during a frequency sweep from 1 to 100 l/s.

TABLE 4

Viscosity and storage modulus as a function of polymer concentration, at 20:1 polymer:aluminum citrate.

| Ex. No. | Conc. (ppm) | Al citrate (ppm) | Viscosity at 25° C. (cP) Day 0 | Viscosity at 25° C. (cP) Day 5 | Viscosity at 25° C. (cP) % Change | G', Pa Day 0 | G', Pa Day 5 | G', Pa % Change |
|---|---|---|---|---|---|---|---|---|
| 1 | 300 | 15 | 4.0 | 12.3 | 210% | 0.003 | 0.036 | 1107% |
|   | 400 | 20 | 5.4 | 24.9 | 365% | 0.002 | 0.089 | 4347% |
|   | 500 | 25 | 7.2 | 188.1 | 2520% | 0.004 | 0.306 | 8584% |
|   | 600 | 30 | 9.2 | 275.1 | 2884% | 0.005 | 0.934 | 18627% |
|   | 800 | 40 | 14.5 | 690.7 | 4650% | 0.008 | 0.892 | 11654% |
|   | 1000 | 50 | 20.8 | 1014.0 | 4770% | 0.009 | 0.766 | 8028% |
|   | 1200 | 60 | 28.6 | 1527.0 | 5241% | 0.015 | 0.755 | 4863% |
| 2 | 300 | 15 | 3.8 | 2.8 | −25% | 0.002 | 0.003 | 31% |
|   | 400 | 20 | 5.1 | 4.3 | −17% | 0.002 | 0.002 | 16% |
|   | 500 | 25 | 6.8 | 5.6 | −18% | 0.003 | 0.003 | −9% |
|   | 600 | 30 | 8.5 | 8.4 | −1% | 0.005 | 0.002 | −50% |
|   | 800 | 40 | 12.7 | 13.0 | 3% | 0.006 | 0.005 | −10% |
|   | 1000 | 50 | 17.9 | 20.3 | 13% | 0.008 | 0.008 | −7% |
|   | 1200 | 60 | 24.2 | 27.9 | 15% | 0.014 | 0.013 | −5% |
| 3 | 300 | 15 | 4.8 | 13.1 | 172% | 0.003 | 0.016 | 393% |
|   | 400 | 20 | 6.8 | 24.6 | 262% | 0.006 | 0.036 | 538% |
|   | 500 | 25 | 9.0 | 24.5 | 173% | 0.005 | 0.045 | 724% |
|   | 600 | 30 | 13.2 | 177.2 | 1246% | 0.011 | 0.079 | 598% |
|   | 800 | 40 | 19.2 | 141.9 | 638% | 0.019 | 0.616 | 3098% |
|   | 1000 | 50 | 26.9 | 1143.9 | 4159% | 0.034 | 1.734 | 4938% |
|   | 1200 | 60 | 33.9 | 1468.5 | 4237% | 0.049 | 1.974 | 3951% |
| 4 | 300 | 15 | 3.7 | 3.5 | −5% | 0.002 | 0.003 | 85% |
|   | 400 | 20 | 5.0 | 4.7 | −5% | 0.002 | 0.003 | 38% |
|   | 500 | 25 | 6.5 | 6.2 | −4% | 0.003 | 0.003 | −7% |
|   | 600 | 30 | 8.2 | 7.8 | −5% | 0.005 | 0.003 | −32% |
|   | 800 | 40 | 12.0 | 11.5 | −4% | 0.006 | 0.006 | 0% |
|   | 1000 | 50 | 16.7 | 16.1 | −4% | 0.011 | 0.008 | −22% |
|   | 1200 | 60 | 22.0 | 21.0 | −5% | 0.016 | 0.013 | −18% |

Example 6

The procedure of Example 5 was repeated except at a 40:1 wt:wt ratio of polymer to aluminum citrate. Results are shown in Table 5.

Figure 2:
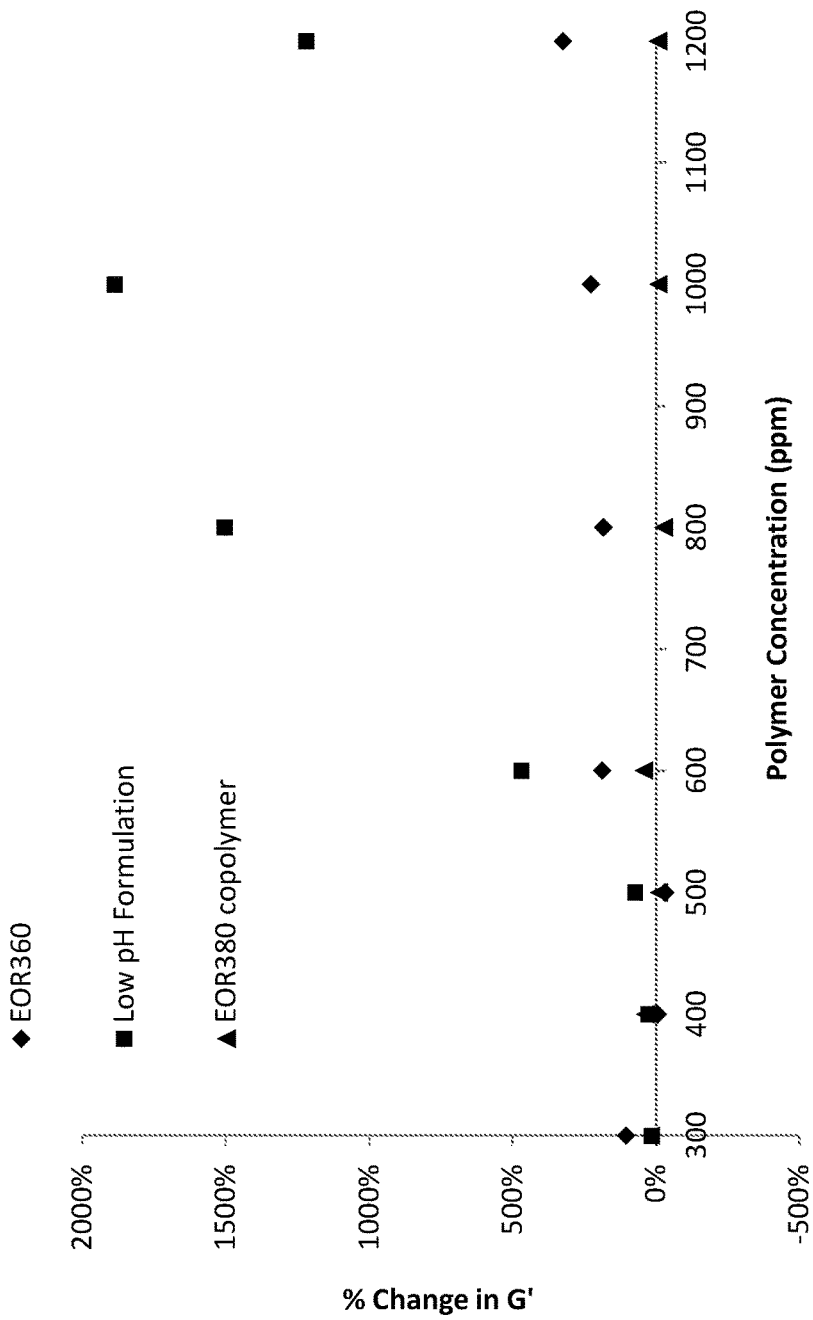
FIG. 2 is a plot of % change in storage modulus, G', as a function of polymer concentration for a polymer of the invention

FIG. 1 is a plot of viscosity at 25° C. measured after aging for 5 days at 50° C. as a function of polymer concentration, wherein the weight ratio of polymer to aluminum citrate crosslinker is 40:1 in each case. FIG. 2 is a plot of % change in storage modulus, G', as a function of polymer concentration, recorded at 1.0 s$^{-1}$ frequency, 2% applied strain at 25° C. during a frequency sweep from 1 to 100 l/s.

TABLE 5

Viscosity and storage modulus as a function of polymer concentration, at 40:1 polymer:aluminum citrate.

| Ex. No. | Conc. (ppm) | Al citrate (ppm) | Viscosity at 25° C. (cP) Day 0 | Viscosity at 25° C. (cP) Day 5 | Viscosity at 25° C. (cP) % Change | G', Pa Day 0 | G', Pa Day 5 | G', Pa % Change |
|---|---|---|---|---|---|---|---|---|
| 1 | 300 | 7.5 | 3.7 | 3.9 | 6% | 0.003 | 0.003 | 16% |
|   | 400 | 10 | 5.0 | 5.7 | 14% | 0.002 | 0.003 | 27% |
|   | 500 | 12.5 | 6.9 | 8.4 | 21% | 0.004 | 0.007 | 73% |
|   | 600 | 15 | 8.8 | 14.2 | 64% | 0.003 | 0.019 | 468% |
|   | 800 | 20 | 14.4 | 57.9 | 303% | 0.006 | 0.092 | 1503% |
|   | 1000 | 25 | 20.8 | 221.9 | 966% | 0.011 | 0.223 | 1887% |
|   | 1200 | 30 | 28.3 | 373.0 | 1217% | 0.014 | 0.191 | 1219% |
| 2 | 300 | 7.5 | 3.8 | 3.8 | 1% | 0.002 | 0.003 | 20% |
|   | 400 | 10 | 5.1 | 5.3 | 3% | 0.002 | 0.003 | 66% |
|   | 500 | 12.5 | 6.8 | 6.9 | 2% | 0.003 | 0.005 | 40% |
|   | 600 | 15 | 8.5 | 8.9 | 4% | 0.005 | 0.004 | −17% |
|   | 800 | 20 | 12.7 | 13.4 | 5% | 0.006 | 0.006 | 2% |
|   | 1000 | 25 | 17.9 | 18.5 | 3% | 0.008 | 0.008 | −8% |
|   | 1200 | 30 | 24.2 | 24.9 | 3% | 0.014 | 0.013 | −3% |
| 3 | 300 | 7.5 | 4.9 | 5.2 | 5% | 0.002 | 0.005 | 105% |
|   | 400 | 10 | 6.9 | 7.5 | 8% | 0.005 | 0.004 | −5% |
|   | 500 | 12.5 | 9.1 | 9.4 | 2% | 0.008 | 0.006 | −31% |
|   | 600 | 15 | 12.3 | 17.4 | 41% | 0.008 | 0.023 | 188% |
|   | 800 | 20 | 19.1 | 22.7 | 19% | 0.018 | 0.050 | 183% |
|   | 1000 | 25 | 24.4 | 48.8 | 100% | 0.027 | 0.087 | 227% |
|   | 1200 | 30 | 33.5 | 213.3 | 537% | 0.049 | 0.206 | 324% |
| 4 | 300 | 7.5 | 3.6 | 3.5 | −4% | 0.003 | 0.003 | 18% |
|   | 400 | 10 | 4.9 | 4.7 | −3% | 0.002 | 0.003 | 38% |
|   | 500 | 12.5 | 6.3 | 6.1 | −4% | 0.004 | 0.003 | −10% |
|   | 600 | 15 | 8.0 | 7.8 | −3% | 0.003 | 0.004 | 42% |

TABLE 5-continued

Viscosity and storage modulus as a function of polymer concentration, at 40:1 polymer:aluminum citrate.

| Ex. No. | Conc. (ppm) | Al citrate (ppm) | Viscosity at 25° C. (cP) | | | G', Pa | | |
|---|---|---|---|---|---|---|---|---|
| | | | Day 0 | Day 5 | % Change | Day 0 | Day 5 | % Change |
| | 800 | 40 | 11.7 | 11.3 | −4% | 0.007 | 0.005 | −26% |
| | 1000 | 50 | 16.3 | 15.8 | −3% | 0.009 | 0.009 | −8% |
| | 1200 | 60 | 21.4 | 20.8 | −3% | 0.015 | 0.013 | −7% |

Example 7

A monomer solution was formed by adding 387.3 g 49.5% acrylamide (in water) and 83.3 g acrylic acid to 387.3 g deionized water. The monomer solution was adjusted to pH of about 3.6 using 14.7 g 50% sodium hydroxide solution, then chilled to 0° C. in a heat-insulated reactor. The monomer solution was subjected to adiabatic polymerization conditions using redox initiators. After completion of polymerization, a solid gel-like polymer solution was obtained. The polymer gel solution was granulated in a granulator to yield a granulated polymer solution wherein the granules are about 10 mm or less in the longest direction. The 0.3% polymer solution was prepared by dissolving the polymer gel granules in 1% NaCl and adjusting the solution to pH 7 using 50% NaOH. The neutral polymer solution was used for subsequent testing.

Example 8

The polymers indicated in Table 6 were precipitated in acetone, isolated by filtration and dried to remove solvent. Then samples for $^{13}C$ NMR analysis were prepared in 10 mm NMR tubes by adding a adding a $D_2O/H_2O$ mixture to the precipitated polymer to produce a 4% polymer solids solution. Then $^{13}C$ NMR spectra were collected on an Inova 300 operating at a $^{13}C$ NMR frequency of 75 MHz. The spectra were collect using a nOe suppression pulse sequence, 90° proton pulse and 15 s relaxation delay. Typically, 16 k data points and 1024 scan were collected. The spectra were processed using 5 Hz line broadening and baseline correction.

Sequence distribution of the carboxyl groups of the polymer was determined by analysis of triad distribution, using the general procedure outlined in Halverson, F. et al., *Macromolecules* 18 (6), 1985, 1139-1144. A carbon NMR spectrum was collected at 75° C. in order to sharpen the carbonyl lines sufficiently to resolve the individual carbonyl triad signals. Mestrelab Research MNova software (obtained from Mestrelab Research of Santiago de Compostela, Spain) was used to deconvolute the overlapping carbonyl signals to determine the individual area. Results are shown in Table 6.

The "blockiness index" of the polymers was also calculated from the triad distribution, using the analysis outlined in Halverson, F. et al., *Macromolecules* 18 (6), 1985, 1139-1144. Notably, 100% block copolymers have a blockiness index value of 0.0; 100% alternating copolymers have a blockiness index value of 2.0; ideally random copolymers have a blockiness index value of 1.0. Blockiness index is also listed in Table 6.

TABLE 6

Triad analysis of the indicated polymers. "Aa" denotes an acrylic acid residue (carboxylic acid carbonyl); "Ac" denotes an acrylamide residue (amide carbonyl).

| | Polymer, Example No. | | | | |
|---|---|---|---|---|---|
| Triad | 1 | 2 | 3 | 4 | 7 |
| AcAcAc | 36% | 36% | 15% | 27% | 31% |
| AaAcAc | 29% | 32% | 36% | 34% | 28% |
| AaAcAa | 3% | 8% | 16% | 10% | 10% |
| AcAaAc | 17% | 14% | 21% | 15% | 12% |
| AaAaAc | 15% | 10% | 12% | 11% | 12% |
| AaAaAa | 0% | 1% | 1% | 3% | 7% |
| Blockiness | 0.97 | 1.14 | 1.36 | 1.15 | 0.99 |

Example 9

The polymers of examples 1-4 and 7 were diluted to 600 ppm with aluminum citrate in 1% NaCl to result in 15 ppm aluminum citrate. Initial viscosity of the diluted polymers was measured with an Anton-Paar MCR302 rheometer using double-gap concentric cylinder geometry held constant at 25° C. The results are reported in Table 7. The reported viscosities were taken from an average of the viscosity data collected at 1 data point every 10 seconds, for 5 minutes. After the initial viscosity was characterized, the 600 ppm polymer/15 ppm aluminum citrate solutions were held at 50° C. for five (5) days in a convection oven before remeasuring viscosity again at 25° C. These results are also shown in Table 7.

TABLE 7

Initial viscosity and viscosity measured and after 5 days at 50° C. for the polymers of the indicated Examples, all diluted to 600 ppm polymer and 15 ppm aluminum citrate.

| | Viscosity, cP | | |
|---|---|---|---|
| Ex. No. | Day 0 | Day 5 | % Change |
| 1 | 8.8 | 14.2 | 61% |
| 2 | 8.5 | 8.9 | 4% |
| 3 | 12.3 | 17.4 | 41% |
| 4 | 8.0 | 7.8 | −3% |
| 7 | 12.4 | 45.4 | 265% |

The invention illustratively disclosed herein can be suitably practiced in the absence of any element which is not specifically disclosed herein. Additionally each and every embodiment of the invention, as described herein, is intended to be used either alone or in combination with any other embodiment described herein as well as modifications, equivalents, and alternatives thereof. In various embodiments, the invention suitably comprises, consists essentially of, or consists of the elements described herein and claimed according to the claims. It will be recognized that various modifications and changes may be made without following the example embodiments and applications illustrated and described herein, and without departing from the scope of the claims.

What is claimed is:

1. A crosslinked composition comprising a water source, about 100 ppm to 1500 ppm of a copolymer of acrylamide and acrylic acid, and about 5 ppm to 100 ppm of an ionic crosslinker, wherein the copolymer has about 50 mole % to 80 mole % acrylamide residues and a blockiness index of about 0.90 to 1.1.

2. The composition of claim 1 wherein the copolymer consists essentially of acrylamide and acrylic acid residues.

3. The composition of claim 1 wherein the copolymer comprises more than 50 mole % acrylamide residue.

4. The composition of claim 1 wherein the copolymer comprises about 70 mole % acrylamide residue.

5. The composition of claim 1 wherein the ionic crosslinker comprises a salt of a multivalent cation comprising $Ca^{2+}$, $Mg^{2+}$, $Zn^{2+}$, $Cr^{2+}$, $Cr^{3+}$, $Al^{3+}$, or a combination of two or more thereof.

6. The composition of claim 5 wherein the counterion of the ionic crosslinker is a residue of an organic acid.

7. The composition of claim 6 wherein the organic acid is acetic acid or citric acid.

8. The composition of claim 1 wherein the viscosity of the crosslinked composition is about 2 to 1000 times the viscosity of the corresponding composition without the ionic crosslinker.

9. The composition of claim 1 wherein the blockiness index is about 0.95 to 1.05.

\* \* \* \* \*